Nov. 26, 1968  J. G. SUTTER  3,412,899
LIQUID POURING INSTALLATION
Filed April 18, 1967  3 Sheets-Sheet 1

Jean Georges SUTTER
INVENTOR by: DeLattre-Seguy, Attorney

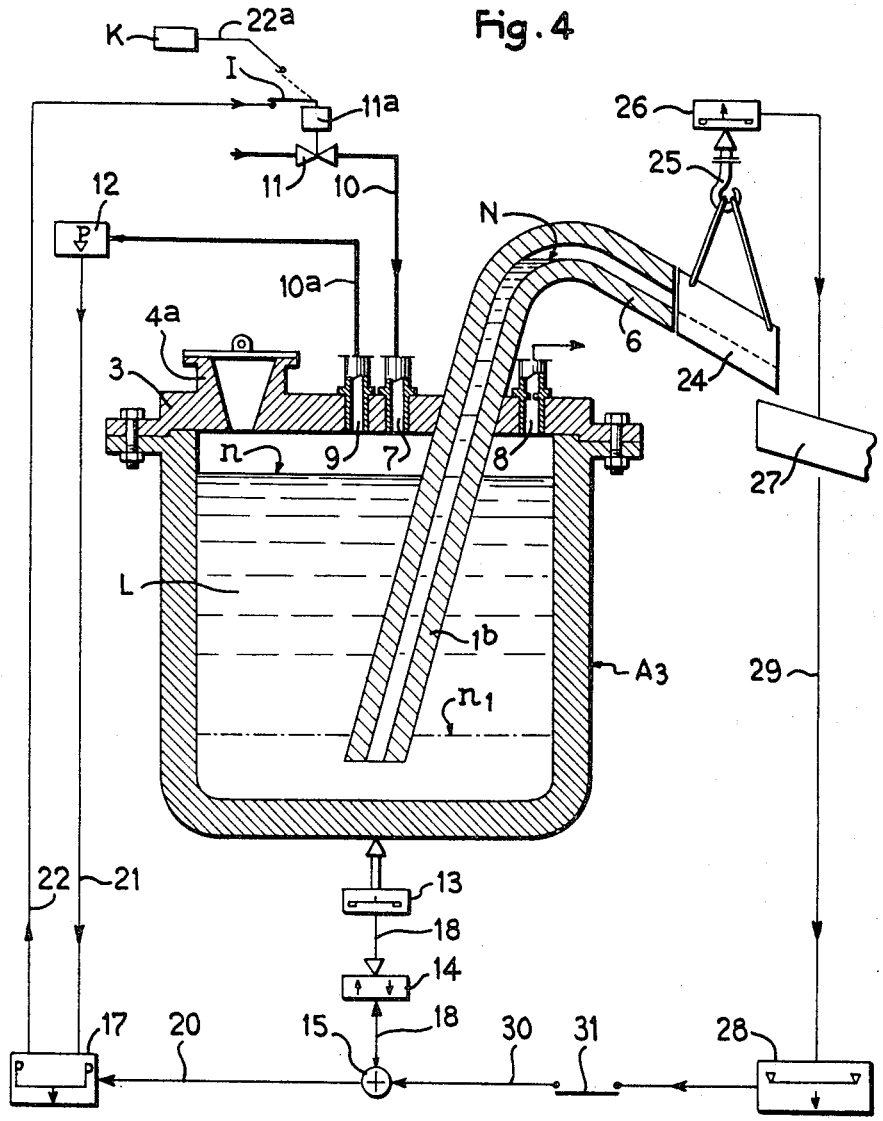

United States Patent Office 3,412,899
Patented Nov. 26, 1968

3,412,899
LIQUID POURING INSTALLATION
Jean Georges Sutter, Villers-les-Nancy, France, assignor to Centre de Recherches de Pont-a-Mousson, a French body corporate
Filed Apr. 18, 1967, Ser. No. 631,763
Claims priority, application France, Apr. 22, 1966
58,602
7 Claims. (Cl. 222—58)

ABSTRACT OF THE DISCLOSURE

A liquid pouring installation comprising a vessel for pouring liquid under the pressure of a fluid of the type having a pouring tube in which the liquid must rise above the level of said liquid so as to be formed into a container and a valve regulating the pressure of said fluid, said installation comprising a control device for controlling the pouring vessel and comprising, in combination with said valve, means for measuring the pressure of said fluid; a pressure regulator connected to said measuring means and to said valve for actuating said valve as a function of the pressure measures; vessel weighing means; an exterior control device for increasing the pressure; an apparatus combining the weight measuring information and pressure increase information to which said weighing means and said exterior control device are connected, said combining apparatus being connected to said pressure regulating valve so that it controls the opening of the valve regulating the pressure of the fluid in accordance with the signals from said combining apparatus.

---

The present invention relates to the pouring of liquids such as molten metals, liquid plastics material and the like and more particularly to the control of pouring vessels of the fixed type in which the liquid issues through the top under the effect of a pressure exerted above the level of the liquid inside the vessel.

More precisely, the invention concerns the control of pouring vessels under the pressure of a gaseous fluid, such as compressed air or an inert gas, or liquid, such as water or oil, depending on the type of liquid to be poured. The pressure of the fluid must ensure the presence of the liquid at a constant maximum level in the pouring spout above the liquid in the vessel so as to result in an immediate start of the pouring and avoid the lost time which corresponds to the time it takes for the liquid to rise in the pouring spout.

The object of the invention is to provide a liquid pouring installation which comprises a vessel for pouring liquid under the pressure of a fluid, of the type comprising a pouring tube in which the liquid must rise above the level it occupies inside the vessel so as to be poured into a container, and a valve regulating the pressure of the fluid above the level of the liquid in the vessel, a control device controlling said pouring vessel and comprising, in combination with said vessel and said valve regulating the pressure of the fluid: means for measuring the pressure of the fluid above the level of the liquid in the vessel; a pressure regulator connected to said measuring means and to said valve so as to actuate said valve as a function of the pressure measured; means for weighing the vessel; an exterior control device for increasing the pressure; an apparatus combining the weight measuring information and pressure increase information to which said weighing means and said exterior control device are connected, said combining apparatus being connected to said pressure regulating valve so that it controls the opening of the valve regulating the pressure of the fluid in accordance with the signals from said combining apparatus.

Owing to this combination the beginning and the end of the pouring of the liquid into a container can be achieved with high precision. If this container is a mould and if the liquid poured is a molten metal or a liquid plastics material, the moulded objects can have a weight determined with high precision and the pouring rate can be very high owing to the elimination of lost time.

Further, high precision is obtained in the liquid flows.

Further features and advantages of the invention will be apparent from the ensuing description with reference to the accompanying drawings.

In the drawings:

FIG. 4 is a diagrammatic view of a modification of the control device.

Figure 1:
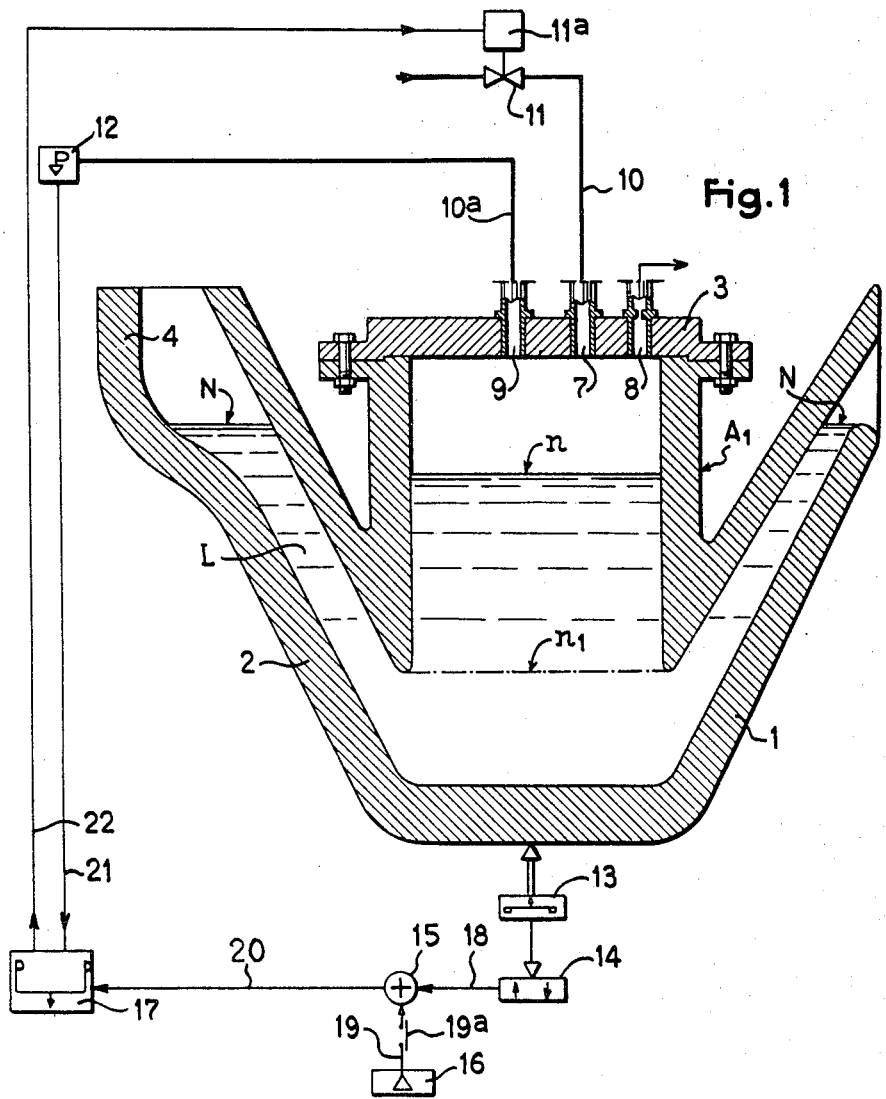
FIG. 1 is a partial diagrammatic view of a pouring installation including a control device according to the invention.

In the embodiment shown in FIG. 1, the invention relates to a pouring installation $A_1$ adapted to contain a liquid metal or metal alloy L between an upper level $n$ and a lower level $n_1$ shown in dot-dash line. The vessel $A_1$ is of the "tea-pot" type and has an upwardly extending pouring tube 1 connected to the lower part of the vessel and having a pouring mouth which communicates with the surrounding air at the height of the upper part of the vessel. The pouring sill is at a level N which is the maximum constant level to be maintained for the reasons explained hereinafter. The vessel $A_1$ also has a filling tube 2 connected to the lower part of the vessel. This upwardly-extending tube is enlarged at 4 so as to form a runner basin which communicates with the surrounding air substantially above the pouring mouth of the tube 1 and the upper part of the vessel. This vessel is provided with a cover 3 which is closed in a fluid tight manner and withstands an internal pressure. Extending through the cover 3 is a number of apertures for the passage of a fluid under pressure, for example air or an inert gas, namely: a compressed air inlet aperture 7 for allowing air into the vessel $A_1$ above the level of the liquid metal; a calibrated discharge aperture 8 for discharging air whose section is adjusted by a constricted passage and is less than the section of the aperture 7; and an air pressure take-off or measuring aperture 9.

In the drawings, the valves, control means and measuring means are of known type and shown symbolically.

The compressed air inlet aperture 7 is connected by a conduit 10 to a valve 11 regulating the compressed air supply pressure. The source of compressed air connected to the valve 11 is not shown. The valve 11 is provided with a control means actuated automatically in accordance with the invention in the manner described hereinafter. These control means 11a can be, for example, an electric servomotor combined with an amplifier amplifying the signals received and in particular an Elliot Fischer device type 657A.

The discharge aperture 8 communicates with the atmosphere. The pressure take-off aperture 9 is connected by a conduit 10a to an apparatus 12 measuring or responsive to pressure. This apparatus can be for example in the form of the Foxboro pressure sensor of the type 613 DM–MK2 having a 610 DC supply and measures the pressure of the compressed air prevailing inside the vessel 1 above the level of the liquid metal. The apparatus 12 is capable of converting the measurement of the pressure into an electric or pneumatic signal sent to another apparatus of the control device according to the invention. In addition to the apparatus 12, the control device comprises the following means:

(1) Weighing means or balance 13 on which the vessel 1 rests. These weighing means 13 measure the weight of the pouring-vessel and are capable of transmitting output signals corresponding to this measurement which can be mechanical, hydraulic, pneumatic or electrical. The weighing means 13 can be constituted for example by an Elliot weighing cell of the type SXC 500 and are completed by signal-inverting means 14 for inverting the signals transmitted by the weighing means. The necessity for this inversion will be explained hereinafter. The signal-inverting means 14 can be for example an Elliott Devar adding and subtracting device of the type 19,301 and can also measure or calibrate the empty vessel. This measurement permits taking into account the wear of the lining of the vessel and also allows the vessel to be changed without disadjustment of the control.

(2) Information-combining and transmitting means 15 which is a pneumatic or electric adding device which can be for example by an Elliot Devar adding and subtracting device of the type 19,301.

(3) Exterior control device 16 for introducing a pressure increase order. This order transmitting device can be an expansion valve in the case of a pneumatic control or a potentiometer or a differential transformer in the case of an electric control. This device 16, for example an Elliot Devar coefficient potentiometer of the type 19,308, permits setting the desired liquid flow.

(4) Pressure regulating means 17, for example an Elliot Devar pressure regulator of a modified type 18,404–2.

The inverted weight measuring signal given by the means 14 and the pressure increase signal given by the device 16 are combined in the apparatus 15 so as to give an order to the pressure-regulating means 17 which receives moreover signals from the pressure responsive apparatus 12.

These various apparatuses are interconnected by transmission means which can be electric or pneumatic, depending on their type.

Thus, provided in the control device according to the invention are: a line 18 transmitting signals connecting the apparatuses 13, 14 and 15 in the direction of 13 towards 14 and 15, a transmission line 19 connecting the pressure increase control device 16 to the combining apparatus 15 in the direction from 16 to 15, a contact 19a in the line 19, a transmission line 20 connecting the apparatus 15 to the pressure regulating means 17, a transmission line 21 between the pressure responsive apparatus 12 and the pressure regulating means 17 in the direction from 12 to 17, and a transmission line 22 between the pressure regulating means 17 and the valve control means 11 which controls the supply of compressed air pressure to the pouring vessel 1.

In the diagrammatic view of FIG. 1, for reasons of clarity the compressed air conduits are shown in thick line whereas the transmission lines of the control device according to the invention are in thin line.

The device operates in the following manner:

As can be seen from FIG. 1, pouring is effected when the liquid metal rises, under the effect of the increasing pressure of the compressed air above the level $n$, above the maximum level N in the upper part of the pouring tube 1 and thus flows over the retaining sill of the pouring tube.

The level of the liquid metal in the pouring vessel depends of course on the amount of liquid metal leaving the pouring vessel. In order to maintain the liquid metal at level N in the pouring tube 1, it is necessary to vary the air-pressure in the vessel $A_1$ in accordance with this level of the liquid metal in the vessel.

Where atmospheric pressure $p_a$ prevails above the level of the liquid metal in the vessel, the level is the same as that in the tubes 1 and 2. In order to raise the level of metal to the level N in the tube 1 and consequently in the tube 2, it is necessary to admit an air pressure into the upper part of the pouring vessel which exceeds the atmospheric pressure $p_a$. Thus, in order to bring the level of metal to level N, a pressure $p$ of compressed air is required in the vessel containing the metal up to the upper level $n$ and a pressure $p^1$ exceeding $p$ if the vessel contains a small amount of liquid metal whose level is lower than the minimum lower level $n^1$.

In order to maintain the metal in the pouring tube 1 at the maximum level N just on the retaining sill, which is the result aimed at, it is necessary to gradually increase the pressure as the level drops from $n$ to $n^1$ inside the vessel 1, that is, as the contents of the vessel are poured into the moulds.

To effect the pouring, that is, to cause the liquid metal to rise in the tube 1 above the level N so as to cause it to overflow the retaining sill of the pouring tube, it is necessary to increase the pressure above the liquid metal an amount which will be terminated $dp$.

Inversely, in order to stop the pouring it is necessary to return the metal to the maximum level N just below the retaining sill, that is, to lower the pressure the amount $dp$. The value of $dp$ varies as the desired pouring flow or rate. If the flow is low, $dp$ is low, if the flow is high, $dp$ is high.

Figure 2:
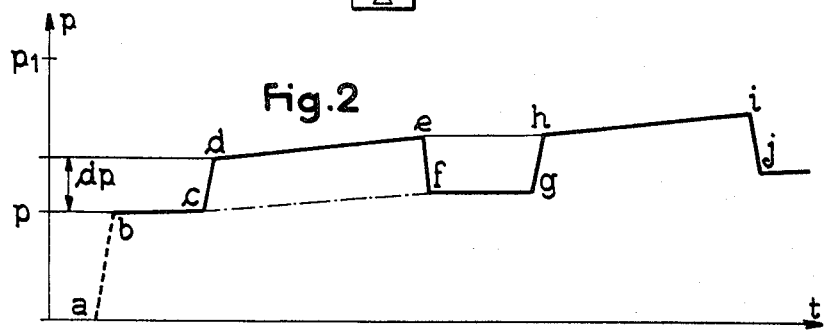
FIG. 2 is a diagram showing the operation of the pouring vessel.

These well-known considerations are expressed graphically in the diagram shown in FIG. 2 in which the time is plotted as abscissae and the pressure as ordinates. This diagram illustrates successive pours interrupted by stoppage (broken line $a$–$b$ . . . $i$–$j$).

In this diagram it is assumed that at $b$ the vessel is full of liquid metal above which prevails a pressure $p$ higher than atmospheric pressure $p_a$. The metal L is at the level $n$ in the vessel $A_1$ and at the level N in the tubes 1 and 2, that is, just on the level of the retaining sill. From $b$ to $c$ (horizontal step) the pressure prevailing in the pouring vessel remains constant. The vessel is ready for pouring. The step $b$–$c$ corresponds to an absence of pouring. From $c$ to $d$ the pressure rises very rapidly (variation $dp$) and the retaining sill of the pouring mouth of the tube 1 is overflowed.

The metal quickly overflows the level N and is poured into a mould. After the retaining sill has been overflowed, a much lower increase in pressure is sufficient for maintaining and continuing the pour. This is represented by the segment $d$–$e$. In order to stop the pouring as suddenly as it was started, a rapid drop in pressure at the same value $dp$ as before is required; this corresponds to the segment $e$–$f$. Consequently, the broken line $c$–$d$–$e$–$f$ corresponds to a pouring stage with a sudden and precise start from $c$ to $d$ and a sudden and precise stoppage from $e$ to $f$. The increase $c$–$d$ of controlled pressure affords good precision in the flow.

The step $f$–$g$ shows that the pressure is maintained constant in the pouring vessel and corresponds, in the same way as the step $b$–$c$, to a stoppage of the pouring. A further pouring occurs in accordance with the broken line $g$–$h$–$i$–$j$. It will be noted that the step $f$–$g$ is higher than the step $b$–$c$ since the vessel is being emptied. Consequently, a higher pressure is required to maintain the level of the liquid metal in the pouring tube 1 at the level N namely substantially at the retaining sill. The pouring, starting and stopping cycles are continued in the same manner until the contents of the pouring vessel drop to the lower level $n^1$ (pressure $p^1$ prevailing in the pouring vessel 1 above the level $n^1$). At this moment, it is necessary to introduce liquid metal into the vessel through the pouring basin 4.

It has been seen that the pressure of compressed air admitted into the vessel must increase as the vessel empties. Consequently, this pressure of compressed air measured by the pressure responsive means 12 must increase in proportion to the decrease in the weight of the metal contained in the vessel. This is the reason why the inverting apparatus 14 inverts the direction of the signals received from the weighing apparatus 13. These signals are a direct function of the weight of the pouring vessel. As signals of increasing intensity are required for resulting in an increase in pressure and as the signals transmitted by the weighing apparatus 13 decrease in intensity as pouring proceeds, the inverting apparatus 14 converts the signals of decreasing intensity received thereby from the apparatus 13 into signals of increasing intensity which are transmitted to the combining means 15 by the line 18.

The control device according to the invention operates in the following manner.

Let it be assumed that the pouring vessel $A_1$ contains a liquid metal up to the level $n$ and that the control device is in service, the switch 19a being, however, open.

With the vessel $A_1$ filled with liquid metal and closed, the apparatuses 13 and 14 for weighing, inverting and measuring send to the apparatus 15 signals which define a pressure order $p$ corresponding to the weight of the vessel. The pressure $p$ is merely maintained in the vessel $A_1$ by the admission of compressed air by way of the conduit 10 at a certain rate regulated by the valve 11. The latter is controlled by the pressure regulating means 17 which controls it as a function of signals received from the apparatus 12 and the apparatuses 13, 14 and 15. A pressure equilibrium is established therefore between the supply of compressed air by way of the conduit 10 and the discharge of compressed air at a lower rate by way of the calibrated discharge aperture 8. Under the effect of this pressure $p$, the level of the liquid is at N in the tubes 1 and 2 namely at the retaining sill of the pouring spout.

Under these conditions, the pouring vessel 5 is in the state of rest ready for pouring (step $b$–$c$).

To pour (segment $c$–$d$), it is necessary to bring the apparatus 16 into action. The contact 19a is therefore closed. This can be achieved by any manual or automatic control for example by the arrival of a mould at the pouring station. A pressure increase order is given by the apparatus 16. The signal given by apparatus 16 is combined with weight signals from the apparatuses 13 and 14 in the apparatus 15 and is transmitted to the pressure regulating means 17. The latter, bearing in mind the other signal it receives from the pressure responsive apparatus 12, actuates the control of the valve 11 in the direction for increasing the supply of compressed air. As has already been seen from the diagram shown in FIG. 2, the pressure increase $dp$ necessary for bringing about the rapid pouring with precision is rather high (segment $c$–$d$). When the liquid metal escapes from the spout 6, the pressure increase is lowered. The orders given by the control device 16 are therefore modified by the action of the apparatuses 13 and 14 in the direction of a substantial lowering of the pressure increase (segment $d$–$e$).

As has been seen hereinbefore, in order to stop the pouring (segment $e$–$f$ of the diagram shown in FIG. 2), it is sufficient to cut the device 16 off from the circuit. The contact 19a is opened for this purpose. The contact 19a can be opened by any manual or automatic control, for example under the effect of the excitation of a photoelectric cell which is responsive to the arrival of liquid metal in the upper part of a mould. The pressure drops rapidly to the extent $dp$. The liquid metal which rose above the retaining sill of the pouring mouth of the tube 1 once more drops to this sill at the level N. At this moment, orders are given by all the apparatuses 13, 14 and 15 so as to maintain sufficient pressure in the vessel and thus maintain the liquid metal at the level N in the pouring tube 1. This pressure is higher than the initial pressure $p$ necessary for bringing the metal to level N when the pouring vessel was full since the level in the vessel $A_1$ has dropped. This period of maintenance corresponds to the step $f$–$g$ in the diagram shown in FIG. 2.

After a certain number of pours, such as that just described, the contents of the vessel $A_1$ drops to the lower level $n^1$ (pressure $p^1$). The vessel must now be filled. The vessel $A_1$ can be filled by way of the basin 4 while leaving the control device in service and consequently maintaining the vessel at pressure $p_1$. In pouring the metal into the basin 4, the level would tend to rise above the level N. However, the control device immediately corrects the pressure by lowering it under the effect of the increased weight measured by the balance 13. Once more, it is the pressure regulating means 17 acting on the valve 11 as a function of the signals received from the pressure responsive apparatus 12 and the apparatuses 13, 14 and 15 which bring about this pressure drop. The pressure would therefore gradually drop from $p^1$ to $p$ as the vessel is filled from the level $n^1$ to the level $n$, the level remaining constant at N in the tubes 1 and 2.

It should be noted that the vessel $A_1$ can be filled at any moment of the operational cycle $b$–$c$ . . . $i$–$j$ without disturbing the cycle and with no danger. Consequently, the filling can be carried out even during the pouring.

For this reason, the height of tube 2, and in particular that of the filling basin 4, exceeds that of the tube 1 in order to avoid a premature overflow. The additional height corresponds to the rising in the level above the retaining sill due to the increase of pressure $dp$ and to a safety margin.

Thus, owing to the combination of the apparatuses 12, 13, 14, 15 and 17 the liquid metal is constantly maintained at the level N situated at the retaining sill of the pouring mouth of the tube 1 outside the pouring periods.

Owing to the apparatus 16 by which the desired flow is set and which is combined with the other apparatuses 12, 13, 14, 15 and 17, the level N is exceeded and this initiates the pouring.

It is this which results in the precise starting and stopping of the pouring and precise pouring rates or flows and consequently precise amounts of liquid metal poured into the moulds. Further, the metal is always ready to leave the pouring mouth of the tube 1 since it is located just at the level N of the retaining sill. In the absence of lost time for causing the liquid metal to rise to this level N the rate of pouring into moulds is therefore very high in mass-production.

These advantages are afforded by the control device according to the invention which controls the pressure and the pressure variations in the pouring vessel with high precision.

Further, the utilization of the "tea-pot" type of vessel $A_1$ enables the control device according to the invention to remain constantly in service so that the vessel $A_1$ is kept constantly under pressure without danger. This results in high operational regularity and safety. Another advantage is that the vessel can be filled at any moment, even during the pouring, so that lost time corresponding to interruption of the pouring is avoided. It is indeed unnecessary to wait until the pouring vessel reaches its lowest level to fill it. Consequently, the vessel $A_1$ under the control of the control device according to the invention can supply liquid metal to any rapid moulding yard at a high mould production rate without necessity to interrupt the production of the moulds, which was previously required owing to lack of liquid metal due to the delay corresponding to the time required for filling the pouring vessel.

Figure 3:
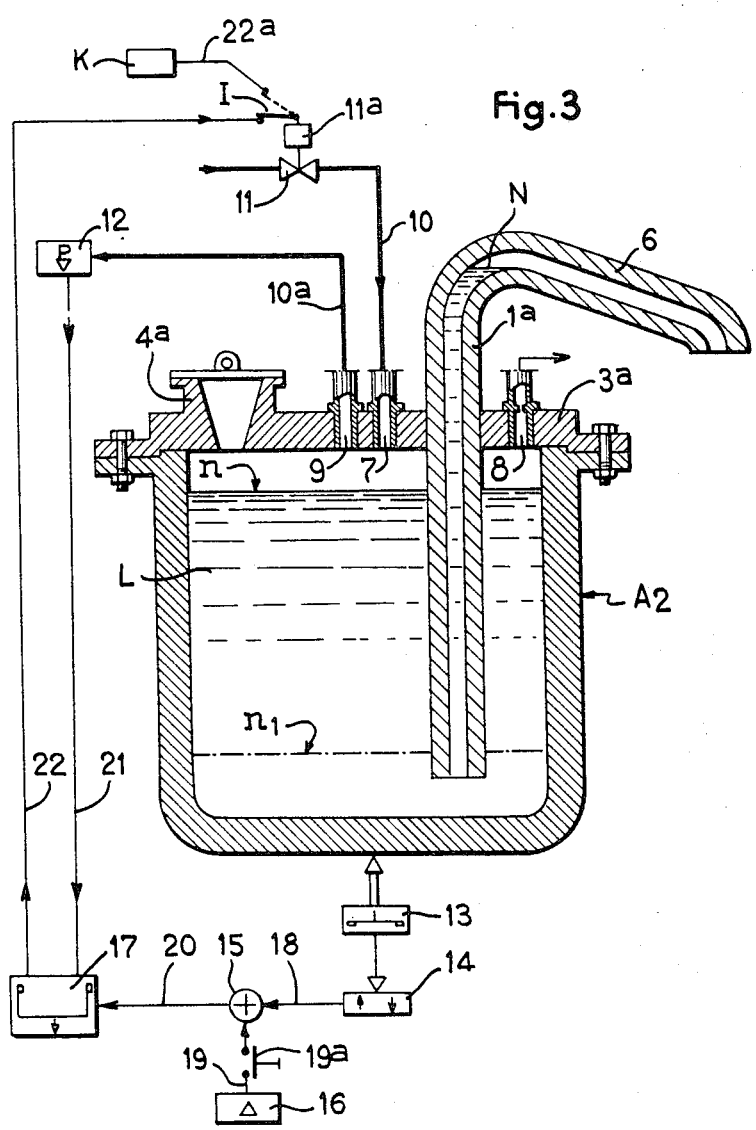
FIG. 3 is a view similar to FIG. 1 of another pouring vessel with a control device according to the invention.

In the modification shown in FIG. 3, the control device according to the invention is applied to a pouring vessel A2. The same elements as those shown in FIG. 1 are designated by the same reference characters. The vessel A2 can be employed in the case where the compressed fluid is not air but a natural gas and has less apertures communicating with the surrounding air than the vessel $A_1$. The tube 2 has been eliminated. For the purpose of supplying the vessel A2 with liquid metal, the cover 3a is surmounted by a pouring basin 4a comprising internally a funnel and closed in a fluidtight manner by a cover which resists the internal pressure.

For the purpose of pouring liquid metal out of the vessel, a pouring tube 1a of refractory material extends through the cover 3a and has a lower end located a little below the bottom of the vessel A2 and an upper end which is bent twice so as to form a pouring spout 6 above the level $n$. The aforementioned compressed gaseous fluid conduits also extend through the cover 3a.

The control device for the vessel A2 is identical to that of the vessel $A_1$ except that the valve 11 can also be closed by an exterior independent control means K to which it is connected by a transmission line 22a which is connected in parallel with the line 22. A change-over switch I permits the connection of either line 22 or line 22a.

The operational conditions are similar to those of the vessel $A_1$ since the operational cycle $b-c \ldots i-j$ is the same. Only the starting and filling conditions are different.

At the start, assuming that the vessel A2 is empty or insufficiently filled with metal, to fill the vessel by means of the basin 4, it is necessary to connect the vessel to the surrounding air under the same conditions as a conventional vessel, supply of compressed fluid, which could be dangerous, being stopped. The control device according to the invention is therefore put out of action by means of the change-over switch I which is placed in the position closing the line 22a and opening the line 22. The supply of compressed air by way of the conduit 10 is interrupted by closing the valve 11 by means of the independent control device K. When the vessel is full, the switch I is shifted to connect the line 22 and bring the control device into action. Further, the contact 19a is opened.

At the start (point $a$ of the diagram), as the pressure prevailing above the liquid metal in the vessel A2 is at the most equal to atmospheric pressure, the level in the tube 1a is at the most equal to the level in the vessel A2. The presure responsive apparatus 12 therefore indicates pressure at the most equal to atmospheric pressure. To cause the liquid metal L in the pouring tube 1a to rise to the level N (segment $a-b$ of the diagram shown in FIG. 2), it is necessary to supply compressed air to the interior of the vessel A2 at a pressure higher than atmospheric pressure. This is achieved by means of the valve 11 which is actuated by the pressure regulating means 17. These pressure regulating means 17 are responsive to the signals received from the apparatus 15 and those from the apparatus 12 and transmits signals through the line 22 to the control valve 11. The compressed air is consequently supplied to the vessel A2 by way of the aperture 7 and the level of the liquid metal starts to rise in the tube 1a. The pressure adjusts itself automatically to the required value for bringing the liquid metal to the level N in the tube 1a.

At each instant, the pressure of compressed air entering by way of conduit 10 is regulated by actuation of the valve 11 which is controlled by the pressure regulating means 17. The inlet pressure of the compressed air rises continuously until the value $p$ (necessary for bringing and maintaining the liquid metal at the level N in the nozzle 1a) is reached. It is the pressure regulating means 17 controlled by the pressure responsive apparatus 12 and by the weighing apparatus 13, the converting apparatus 14 and the signal combining apparatus 15, which brings about this pressure increase.

When the level N is reached in the tube 1a, the pressure $p$ is maintained under the same conditions as in the vessel $A_1$. At this moment, the point $b$ of the diagram shown in FIG. 2 is reached under the same operational conditions as before. When after a certain number of pours the level of the liquid metal L has dropped to level $n_1$ ($p_1$), it is necessary once more to fill the vessel by stopping the supply of compressed air and proceeding as indicated hereinbefore.

In the modification shown in FIG. 4, the invention is applied to a pouring vessel A3 and to a device controlling this vessel which is equipped not only with means for maintaining the liquid metal at a maximum level N in the pouring tube and for exceeding this level in accordance with a desired flow, but also with means for measuring and controlling the effective flow of metal.

In this modfication shown in FIG. 4, the same elements as those shown in FIG. 1 are designated by the same reference characters.

The pouring vessel is employed for example for supplying liquid metal to a centrifugal pipe casting machine but is capable of being employed in any other foundry installation, and comprises carried by the cover 3, a pouring tube 1b which can be for example inclined instead of vertical. This tube is bent in its upper part so as to form a spout and supplies the liquid metal to a short channel 24 which is suspended from a hook 25 depending from a second balance or weighing apparatus 26, for example an Elliot weighing cell of the type SXC 100 which can have a mechanical, pneumatic or electric transmission. The channel 24 has a well-defined cross section and is adapted to be filled with liquid metal in the course of pouring. This section can be tubular or have a horse-shoe shape. The weighing apparatus 26 is therefore responsive to variations in the weight of the channel 24 and gives signals which are proportional to these variations in weight or flow.

After having passed through the channel 24 the metal falls for example onto a pouring device 27 which is extended by a pouring trough of a centrifugal casting machine (not shown). As mentioned hereinbefore, the weighing apparatus 26 is responsive to the variations in the weight of the channel 24 and indicates at each instant the weight of the stream of metal flowing through this channel and consequently the flow of liquid metal. The signals of the weighing apparatus 26 are transmitted by a line 29 to a weight regulating apparatus 28 for example the Elliot Devar regulating device of type 18404-2. The weight regulating apparatus 28 sets the desired flow. This weight regulating apparatus is connected to the information combining apparatus 15 by a line 30 in which is inserted a contact 31 controlling the beginning and the end of the pouring.

In this control device the apparatus 16, which in the preceding embodiment set the desired flow and sent to the apparatus 15 the signals for increasing the pressure, is eliminated. It is replaced by the combination of the weighing apparatus 26 and the weight regulating apparatus 28 which performs the function of the external pressure increase control.

This control device operates in the following manner:

The level of the liquid metal is maintained at level N as before. During the periods of no pouring (steps $b-c$ and $f-g$ of the diagram shown in FIG. 2) the contact 31 is open. The apparatuses 26 and 28 are inoperative. To start the pouring, the contact 31 is closed and this gives the signal for increasing the pressure (segments $c-d$ and $g-h$ of the diagram shown in FIG. 2).

In the course of the pouring, which is carried out under the same conditions of pressure as before, the signals measuring the flow transmitted by the weighing apparatus 26 are compared in the weight regulating apparatus 28 with the desired flow setting in this weight regulating apparatus. In turn, the latter transmits to the apparatus 15 the signals correcting the variation in pressure which are transmitted by the line 20 to the pressure regulating apparatus 17. These pressure correction signals transmitted by the line 20 permit an adjustment in the pressure variations so that the effective pouring flow measured by the weighing apparatus 26 is equal to the desired pouring flow which is set in the orders recorded by the weight regulating apparatus 28. The combination of the effective pouring flow with the flow programme by means of the weight regulating apparatus 28 according to the invention thus ensures a required flow at each instant which is known in a precise manner.

To stop the pouring, the contact 31 is opened and this puts the apparatuses 26 and 28 out of circuit and results in a rapid drop in pressure as shown by the segments $e-f$ and $i-j$ of the diagram shown in FIG. 2.

Owing to the fact that the apparatus 16 is replaced by the device combining the weighing apparatus 26 and the weight regulating apparatus 28 applied to the suspended channel 24, the control device shown in FIG. 4 has the advantage of resulting in a much higher precision in the measurement and control of the flow than the control device shown in FIG. 1. The weighing is effected by means of the weighing apparatus 26 on an amount of liquid metal which is limited to that contained by the channel 24 and is consequently much smaller than that contained in the vessel A3. Consequently, with an apparatus 26 having a precision relatively equal to that of the apparatus 13, the absolute precision can be much higher since the measurement is based on a small amount of metal. Thus, in employing balances 13 and 26 which are accurate to within $\frac{1}{1000}$ and in assuming that the pouring vessel contains 500 kg. of liquid metal and the channel 24 only 1 kg. of liquid metal, the absolute precision in the embodiments shown in FIGS. 1 and 3 (in which only the balance 13 is employed) is 500 g., whereas the absolute precision in the embodiment shown in FIG. 4 (employing the balance 26) is 1 g. Consequently, the weight regulating apparatus 28 transmits signals to the apparatus 15 and consequently controls the flow of a vessel containing for example 500 kg., of liquid metal to within 1 g.

Although specific embodiments of the invention have been described, many modifications and changes may be made therein without departing from the scope of the invention as defined in the appended claims.

Thus the invention is applicable to the metering and control of the flow of any liquid other than molten metals, such as for example liquid plastics materials, to be poured into moulds and any kind of liquid to be poured into tanks or containers.

The pressure of compressed air can be regulated in a discharge conduit instead of the supply conduit 10. In this case, it is the aperture 7 which is calibrated instead of the aperture 8 and valve 11 is inserted in a discharge conduit connected to the aperture 8. Note that the valve 11 can be actuated by an independent external control $K_1$ which closes the valve 11 instead of opening it. However, the operation of the control remains the same.

Further, instead of the measurement of the vessel and the inversion of the measuring signals being effected by means of a single apparatus 14, these two functions can be performed by two separate apparatuses.

An exterior control can be adapted to the device actuating the tea-pot vessel $A_1$ in the case where it is desired to stop the supply of compressed air while the vessel is being filled although, as already mentioned, this is not essential.

Having now described my invention what I claim as new and desire to secure by Letters Patent is:

1. A liquid pouring installation comprising a vessel for pouring liquid under the pressure of a fluid, said vessel having a pouring tube in which the liquid must rise above the level of said liquid in the vessel so as to be poured into a container, and a valve regulating the pressure of the fluid above the level of the liquid in the vessel, said installation comprising a control apparatus controlling said pouring vessel and comprising, in combination with said vessel and said valve regulating the pressure of the fluid: means for measuring the pressure of the fluid above the level of the liquid in the vessel; means for measuring the weight of the vessel and transmitting signals corresponding to the weight measurement; an exterior control device for producing signals for increasing the pressure of the fluid in the vessel; a combining apparatus; said weight measuring means and said exterior control device being connected to said combining apparatus to feed into said combining apparatus whereby said weight measurement signals and said pressure increasing signals are combined; a pressure regulator connected to said valve to control said valve, and said combining apparatus and said pressure measuring means being connected to said pressure regulator to feed into said pressure regulator.

2. An installation as claimed in claim 1, wherein the exterior control device for increasing the pressure comprises in combination a weighing apparatus, a channel for pouring liquid suspended from said weighing apparatus in a position adjacent the pouring tube of the vessel and a weight regulating apparatus connected to said weighing apparatus and to said combining apparatus.

3. An installation as claimed in claim 1, comprising an apparatus for inverting the signals transmitted by the weighing means, said inverting apparatus being interposed between said means for measuring the weight of the vessel and said combining apparatus.

4. An installation as claimed in claim 1, comprising a signal transmitting line connecting said exterior control device to said combining apparatus, and a contact connected in series in said transmitting line.

5. An installation as claimed in claim 1, comprising a first control line connecting said pressure regulator to said valve, an exterior independent control line connected to said valve in parallel with said first control line, and a change-over switch inserted in said first line and said independent line whereby either of said lines can be brought into action by said switch, the exterior control line being adapted to stop the supply of fluid under pressure during the filling of the pouring vessel.

6. An installation as claimed in claim 1, comprising a pouring vessel of the teapot type having a cover which closes in a fluidtight manner in the upper part of the vessel and an upwardly-extending pouring tube connected to the lower part of the vessel, said tube having a pouring mouth which communicates with the surrounding air approximately at the level of the upper part of the vessel, a filling tube connected to the lower part of the vessel and surmounted by a pouring basin which communicates with the surrounding air substantially above the level of the mouth of the pouring tube, and compressed fluid conduits extending through the cover and connecting said vessel to the control apparatus.

7. An installation as claimed in claim 1, comprising a pouring vessel having in the upper part thereof a cover which closes the vessel and through which extends a pouring tube which extends downwardly into the vessel and has a pouring mouth located above the vessel, and compressed fluid conduits extending through the cover and connecting the vessel to the control apparatus.

References Cited

UNITED STATES PATENTS

| 1,813,381 | 7/1931 | Carrington | 222—397 X |
| 2,287,829 | 6/1942 | Bryan | 222—373 X |
| 2,469,230 | 5/1949 | Harper | 222—58 |
| 3,221,379 | 12/1965 | Shearman | 222—394 X |
| 3,286,311 | 11/1966 | Rhoads | 222—61 |
| 3,321,116 | 5/1967 | Loffin | 222—394 X |
| 3,347,418 | 10/1967 | Fefferman | 222—61 |

FOREIGN PATENTS 629,028  10/1961  Canada.

SAMUEL F. COLEMAN, *Primary Examiner.*